United States Patent
Metzger

[15] 3,685,191
[45] Aug. 22, 1972

[54] FISHING LURE

[72] Inventor: Carl P. Metzger, 180 Burnside Rd., Victoria, British Columbia, Canada

[22] Filed: Feb. 5, 1971

[21] Appl. No.: 112,932

[52] U.S. Cl. ............43/42.05, 43/42.23, 43/42.34, 43/42.52
[51] Int. Cl. ..................................A01k 85/00
[58] Field of Search.....43/42.05, 42.23, 42.36, 42.34

[56] References Cited

UNITED STATES PATENTS

| 1,434,204 | 10/1922 | Grounsell | 43/42.05 |
| 2,528,861 | 11/1950 | Clasen et al. | 43/42.05 |
| 3,205,608 | 9/1965 | Dickinson | 43/42.23 |

Primary Examiner—Samuel Koren
Assistant Examiner—Daniel J. Leach
Attorney—Fetherstonhaugh & Co.

[57] ABSTRACT

A lure attachable to a leader securing a hook to a fishing line. The lure is shaped to simulate a strip of fish bait and has a body and a relatively wide head which is provided with a leading edge which acts as a planing surface and a top edge. Holes are drilled through the head to emerge on the top edge and the leader slidably extends through a selected one of the holes initially to position the hook alongside the body. The curved shape of the body, the planing action of the leading edge, and the spacing of the leader relative to the leading edge as determined by the hole selected to receive the leader, all combine to give a particular swimming action to the lure as it is drawn through the water.

5 Claims, 4 Drawing Figures

PATENTED AUG 22 1972 3,685,191

INVENTOR
CARL P. METZGER
BY
Fetherstonhaugh & Co.
ATTORNEYS

FISHING LURE

My invention relates to fishing lures and more particularly to a lure designed to simulate a herring strip.

One of the most popular and successful lures for catching Pacific salmon is a device commonly referred to as a herring strip and comprising a holder with a small herring, or preferably a slice taken lengthwise off a large herring, attached thereto. The fish bait is secured to the holder normally by means of a toothpick or transversely extending pin and this a time consuming and tedious task which is objected to by many fishermen and particularly commercial fishermen. There are other disadvantages to using this type of fresh bait lure, for example, the need to keep a supply of fresh bait on hand which usually requires refrigeration on a commercial fish boat and the fact that the bait itself is extremely vulnerable and quite easily lost. However, fishermen have hitherto put up with these disadvantages in view of the excellent fishing record of the herring strip device.

I provide a lure having the general appearance of a herring strip but which does not require the use of fresh bait to attract fish. The lure is shaped to roll as it is trolled through the water and to otherwise move about in a manner most likely to attract the attention of the salmon or other game fish and to deceive the fish into thinking it is a live but injured herring darting about in the frantic effort to escape. Once the fish strikes the rotating lure and is impaled by the hook, the lure moves upwardly along the leader to escape damage in the ensuing struggle. The rate at which the lure rolls or rotates during trolling can be adjusted by altering the position of the leader where it extends forwardly of the lure and relative to adjacent parts of the head of the lure.

In drawings which illustrate a preferred embodiment of the invention,

Figure 1:
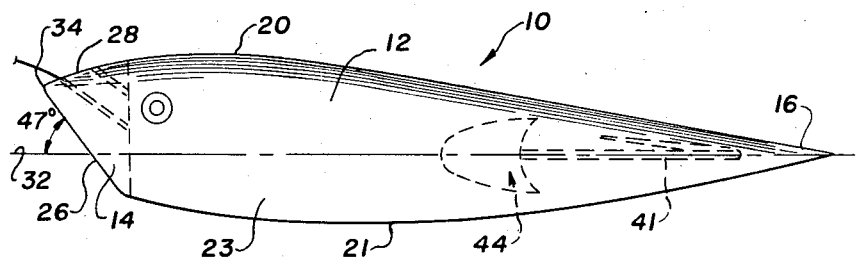
FIG. 1 is a side elevation of a lure in accordance with the present invention.

Referring to the drawings, the numeral 10 indicates generally a lure which preferably is made of a tough, flexible plastic material. The lure 10 is shaped somewhat like a small strip sliced off the side of a herring so as to have a body 12, a head 14, and a tail 16 which may simply be tapered to a point without having the usual tail fins.

Figure 2:
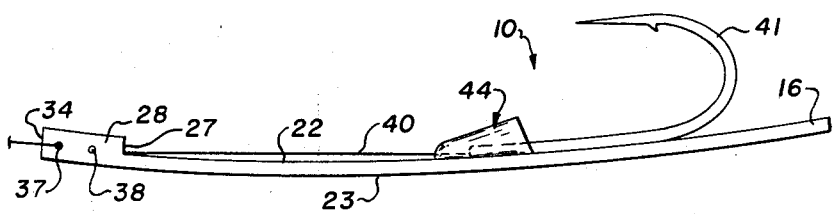
FIG. 2 is a top plan view.

Body 12 is a molded strip having an upper edge 20, a lower edge 21, and parallel side faces 22 and 23. As shown in FIG. 2, the body 12 is longitudinally curved between the head and tail. Thus the side face 22 is inwardly bowed or substantially concave and the side face 23 is outwardly bowed or substantially convex. I prefer to paint the convex side face 23 so as to represent the scale side of a strip cut from the body of a herring. The concave side face 22 is left unpainted whereby the plastic material gives the appearance of the flesh side of the herring strip. It is known that Pacific salmon are more inclined to strike at lures of some colors than of other colors the preference appearing to vary at different stages of the growing cycle of this game fish. To take advantage of this habit, I propose to mold the present lure in solid colors of various shades. The convex side 23 may then be covered with a readily available adhesive attached synthetic material which is silver colored and has embossed sequins to give the lure the scale effect of a natural herring strip.

The head 14 is a substantially triangular shaped portion which is slightly thicker than the body 12 and preferably said head projects laterally beyond the concave side face 22. Thus the head 14 has a relatively wide leading edge 26, a trailing edge 27, and an upper edge 28. Edge 26 is disposed at an angle of about 47° to the longitudinal axis 32 (FIGS. 1 and 3) of the fishing lure. Trailing edge 27 of the head can be disposed at right angles to the axis 32 or approximately so as shown best in FIG. 3. Upper edge 28 is a continuation of the corresponding edge 20 of the body and therefore curves forwardly and downwardly to form with the leading edge 26, a nose 34.

Figure 3:
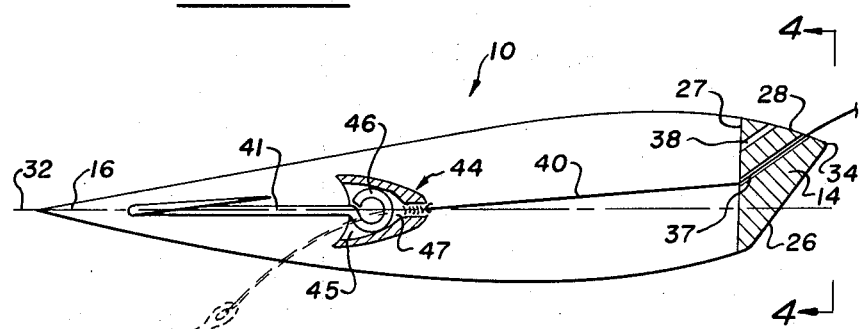
FIG. 3 is an elevation of the side of the lure opposite to the side shown in FIG. 1.
Figure 4:
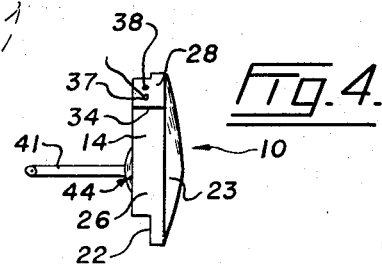
FIG. 4 is a view taken on the line 4—4 of FIG. 3.

Referring again particularly to FIG. 3, the head 14 will be seen to be provided with holes 37 and 38. Only two holes are shown for the sake of convenience although more may be provided if desired and the holes illustrated are drilled through the head 14 to appear on the trailing edge 27 and the upper edge 28. The hole 37 starts about midway along the trailing edge 27 and extends upwardly at an angle of about 45° to said edge to appear on the upper edge 28 spaced approximately one-fourth of an inch to the rear of the nose 34. Hole 38 is disposed at substantially the same angle relative to the trailing edge 27 but is a relatively short hole which cuts across the upper corner of the head as best shown in FIG. 3, this hole being located about one-half an inch to the rear of the nose 34.

The fishing lure 10 is adapted to be attached to a leader 40 of the type used to connect a hook 41 to a fishing line, not shown. In order to releasably secure the hook 41 to the present lure, the body 12 is provided with a holder 44 which projects outwardly from the concave side face 22 and is located on the axis 32. Holder 44 provides a socket 45 which is shaped to receive the eyed end 46 of the hook. An opening 47 is formed in the forward end of the holder 44 to communicate with the socket 45.

When the hook 41 is positioned to project laterally of the side face 22 as shown in FIG. 2, and the eyed end 46 is pushed into the socket 45, the holder 44 exerts a slight wedging pressure on the hook normally to hold it against withdrawal. The leader than projects forwardly through the opening 47 to the head 14 where it slidably extends through either the hole 37 or the hole 38 depending on the speed at which the trolling is to be done.

The fisherman may choose to troll at a fairly slow speed and would then use hole 37 to guide the leader 40 through the head 14. As the lure 10 is drawn through the water, it is caused to roll or rotate about the longitudinal axis 32 and this rolling or rotating action appears to be caused by the leading edge 26 and the location of the point of attachment of the leader 40 to the edge 28. Leading edge 26 acts as a planing surface as it moves forwardly through the water and since it is disposed at a slight angle to the direction of travel of the lure, due to the curvature of body 12, a force is applied which tends to rotate the lure. The rolling movement is about the portion of leader 40 which extends forwardly of the head 14 and this portion enters the hole 37 a short distance (one-fourth of an inch in this instance) to the rear of the nose 34. The part of the head from the upper edge end of the hole 37 to the nose 34 exerts a slight braking effect on the action of the lure 10 and this, combined with the amount of curvature which is given to the body 12, apparently determines the speed of rotation of the lure, which speed is at a desirably slow rate. The head 14 describes a small circle while the tail 16 describes a larger circle as the lure 10 travels through the water.

As this rolling or rotating action takes place, the lure 10 moves from side to side as well as up and down somewhat in the manner of a small live but injured fish swimming erratically to escape attack and this has been found to be particularly effective in enticing salmon to strike at the lure 10. When the salmon strikes and is caught by the hook 41, the first reaction of the fish is to jerk its head to one side in an effort to dislodge the hook and as a result, the lure is force forwardly along the leader 40 and the hook is pulled out of the holder 44 as shown in dotted line in FIG. 3. Thus, the lure 10 is less likely to be damaged by the fish as it struggles to free itself from the hook.

At times the fisherman may want to troll at a higher speed of the action of tidal currents may make the relative speed of the lure 10 through the water higher than normally would be the case. The fisherman would then thread the leader 40 through the hole 38 whereby to increase the spacing of the point of attachment of said leader from the nose 34. It has been found that, by using hole 38, the rate of spin of the lure is maintained close to the desirable slow rate as before in spite of the fact that the trolling speed is higher. One reason for this is that the tail 16 is tilted upwardly to a slight extent due to the point of attachment of the leader 40 to the head 14 being relatively widely spaced from the nose 34. Since the lure 10 is then inclined at a small angle to the axis 32, the angle of the leading edge 26 is decreased and the angle of the upper edge 28 is increased, both relative to the path of travel of the lure. Edge 26 then is slightly less effective and the braking or drag effect of the upper edge is greater. Thus the rolling and darting action of the lure 10 in the water is not speeded up as might otherwise be the case to a degree which might frighten off game fish and which might reduce the likelihood of the fish becoming caught by the hook if it was tempted to strike.

From the foregoing, it will be apparent I have provided a fishing lure which is inexpensive to manufacture and is extremely long lasting. The hook is quite easily reset into the holder whenever it is withdrawn therefrom and the device then is ready to be cast back into the water once again with a minimum loss of fishing time.

I claim:

1. A fishing lure comprising a body shaped to simulate a herring strip and including a head and a tail, said body curving longitudinally between the head and the tail and having a concave side face; said head being of a greater width than the body and having a downwardly and rearwardly inclined leading edge, a substantially transverse trailing edge, and an upper edge; a hole extending upwardly through the head between the trailing edge and the upper edge, a hook secured to a leader, said leader extending alongside the concave side face and through the hole to project forwardly of the head, said hole being spaced a predetermined distance rearwardly of the leading edge and combining with the planing action of the leading edge to spin the lure at a suitable speed as it is drawn through the water.

2. A fishing lure as claimed in claim 1, and including a second hole extending upwardly through the head between the trailing edge and the upper edge and adapted to receive the leader instead of the first mentioned hole, said second hole being spaced further to the rear than the first mentioned hole.

3. A fishing lure as claimed in claim 1, and including a holder on the concave side face to releasably secure the hook to the body.

4. A fishing lure as claimed in claim 3, in which said holder has a socket to receive the eyed end of the fish hook whereby to support said fish hook projecting laterally from the body, and said holder having an opening through which the leader extends.

5. A fishing lure comprising a body shaped to simulate a herring strip and including a head and a tail, said body curving longitudinally between the head and the tail and having a concave side face; said head being of a greater width than the body and having a downwardly and rearwardly inclined leading edge, a substantially transverse trailing edge, and an upper edge; a first and a second hole extending upwardly through the head between the trailing edge and the upper edge, said second hole being spaced further away from the leading edge than the first hole, a hook secured to a leader, said leader extending alongside the concave side face and being selectively threaded through either the first hole or the second hole to project forwardly of the head, a holder on the concave side face of the body, said holder having a socket to releasably house the eyed end of the fish hook and support said fish hook projecting laterally from the body, and said holder having an opening through which the leader extends.

* * * * *